(12) United States Patent
Lindsay et al.

(10) Patent No.: US 7,353,099 B2
(45) Date of Patent: Apr. 1, 2008

(54) PALLET TRUCK TILLER ARM WITH ANGULAR SPEED MODE ADJUSTMENT AND ACCELERATION CONTROL

(75) Inventors: Ryan Philip Lindsay, Moline, IL (US); Alan W. Bartels, Wilton, IA (US)

(73) Assignee: The Raymond Corporation, Greene, NY (US)

( * ) Notice: Subject to any disclaimer, the term of this patent is extended or adjusted under 35 U.S.C. 154(b) by 749 days.

(21) Appl. No.: 10/973,466

(22) Filed: Oct. 26, 2004

(65) Prior Publication Data
US 2006/0089778 A1   Apr. 27, 2006

(51) Int. Cl.
*B62D 5/04*   (2006.01)
*G06F 19/00*   (2006.01)

(52) U.S. Cl. ............................. 701/50; 701/70; 701/78; 180/332

(58) Field of Classification Search .................. 701/50, 701/70, 78, 1, 41, 79; 180/19.2, 19.3, 332, 180/333, 334, 65.2; 280/778
See application file for complete search history.

(56) References Cited

U.S. PATENT DOCUMENTS

| 3,757,180 | A | | 9/1973 | Subler |
| 3,791,474 | A | | 2/1974 | Stammen et al. |
| 4,444,284 | A | | 4/1984 | Montemurro |
| 4,716,980 | A | | 1/1988 | Butler |
| 4,942,529 | A | | 7/1990 | Avitan et al. |
| 5,964,313 | A | * | 10/1999 | Guy ........................... 180/332 |
| 6,135,694 | A | | 10/2000 | Trego et al. |
| 6,464,025 | B1 | * | 10/2002 | Koeper et al. ............. 180/19.2 |
| 6,491,122 | B2 | | 12/2002 | Leitner et al. |
| 6,595,306 | B2 | * | 7/2003 | Trego et al. ............... 180/19.2 |
| 2003/0057000 | A1 | | 3/2003 | Fortin |
| 2007/0038355 | A1 | * | 2/2007 | Brandt et al. .................. 701/50 |

FOREIGN PATENT DOCUMENTS

| EP | 1 013 602 B1 | 12/1998 |
| EP | 1 125 819 B1 | 2/2001 |
| EP | 1 264 759 B1 | 8/2001 |

* cited by examiner

*Primary Examiner*—Tan Q Nguyen
(74) *Attorney, Agent, or Firm*—Quarles & Brady (57) ABSTRACT

A motorized pallet truck includes an angular indicator on the steering arm mechanism providing an internal controller with an angular position of the steering arm or tiller. The controller applies a brake when the tiller is in either of a substantially vertical or substantially horizontal position, limits the speed of the truck for a predetermined rotational movement from the vertical position, and allows full speed of the vehicle when the tiller arm is pulled into a predefined fast driving arc. The controller further limits the rate of acceleration of the truck when the truck is transitioned between a slow and a fast mode of operation to prevent rapid acceleration in the speed of the truck during the transition.

18 Claims, 7 Drawing Sheets

PALLET TRUCK TILLER ARM WITH ANGULAR SPEED MODE ADJUSTMENT AND ACCELERATION CONTROL

CROSS REFERENCES TO RELATED APPLICATIONS

Not Applicable

FIELD OF THE INVENTION

The present invention relates to material handling vehicles and, more particularly, to a material handling vehicle which is steered with a steering tongue or tiller arm including an angle detector for limiting the speed of the vehicle based on the angle of the tiller arm, and a control for limiting the acceleration of the vehicle to limit changes in speed during transitions between speed modes.

BACKGROUND OF THE INVENTION

Industrial material handling vehicles such as fork lift trucks or motorized hand pallet trucks are commonly found in warehouses, factories, and, generally, wherever pallets, packages, or loads of goods are required to be moved from place to place. Pallet trucks typically include a load bearing fork or lift arm for lifting packages or pallets to a height sufficient for transporting, an electric drive motor for driving the vehicles, a steering control mechanism, and a brake. These vehicles can include an operator station, on which the operator stands as the pallet truck moves, or can be designed for the operator to walk behind the vehicle at the end opposite the forks.

The steering mechanism for a common type of pallet truck includes a movable arm or tiller and a control handle mounted at the end of the tiller. The tiller is rotatable right and left to steer the vehicle, while a rotatable thumb wheel or twist grips on the handle control the speed and direction of the truck, selecting between a forward and a reverse direction. To prevent movement of the truck when the operator has left the vehicle, the steering tiller arm is typically spring loaded. When the tiller is released, it is forced by the spring to a near vertical position outside of a defined operating arc. In the vertical position, a spring-applied "deadman" brake mechanism is automatically activated to prevent further motion of the vehicle.

In another type of material handling vehicle, the tiller arm is used to establish a speed range for the vehicle as the tiller arm is rotated between the vertical and horizontal position. In these vehicles, a slower mode of operation is typically provided when the tiller arm is in the near vertical position, and a faster mode or modes of operation are allowed as the tiller is moved toward the horizontal. The driver changes the mode by changing the angle of the tiller arm. These vehicles are particularly useful, for example, in narrow lanes and, in an increasingly common mode of operation, inside of trailers and other large containers for moving goods, as the vehicle can be controlled at a slow speed with the tiller in a nearly vertical position. These vehicles, however, suffer from certain disadvantages. When the truck transitions from slow to fast, typically a rapid increase in travel speed occurs. This rapid acceleration of travel speed is desirable when the operator is prepared to walk at a faster rate, but not (for example) when the operator is maneuvering the truck in a tight area and inadvertently crosses the threshold. This invention creates a smooth transition to fast mode in the event the operator has been operating in slow mode, but also allows for the desirable acceleration to fast mode if the slow mode zone is quickly passed through.

SUMMARY OF THE INVENTION

In one aspect of the invention, a method is provided for controlling the acceleration of a material handling vehicle to provide a smooth transition while transitioning between at least a slow and a fast speed mode of operation. The method comprises determining when the vehicle is in the slow speed mode, determining whether the vehicle is being driven at a non-zero speed in the slow speed mode, and calculating a time of operation at the non-zero speed in the slow speed mode. If this time exceeds a predetermined minimum time, the acceleration of the vehicle is limited when the vehicle is moved into the fast mode of operation.

The step of determining the mode of operation can be provided by determining an angle of a steering mechanism provided on the industrial truck. After a predetermined period of time, the acceleration can be increased to a predetermined normal rate. This time can be calculated as a function of an amount of time required to accelerate the vehicle to the maximum speed at the limited acceleration rate.

In another aspect of the invention, a material handling vehicle is provided including a drive system controlled by the operator to drive the material handling vehicle in a selected direction, a steering mechanism moveable along an arc to select between at least a slow and a fast mode of operation, and an operator control for selecting a speed of the vehicle in the selected mode of operation. A controller selectively places the material handling vehicle in the slow mode or the fast mode of operation based on the angle of the steering mechanism, and is programmed to adjust the acceleration rate of the vehicle when a transition is made between the slow mode and the fast mode to provide a smooth vehicle response.

This adjustment can include calculating a time period that the material handling vehicle is moving in the slow mode of operation, and then limiting the acceleration of the material handling vehicle to a predetermined rate of acceleration below the normal rate of acceleration when the time period exceeds a predetermined minimum and the material handling vehicle is transitioned into the fast mode of operation. The limitation on the acceleration can be maintained for a predetermined period of time, and this time can be calculated to allow the vehicle to reach a maximum speed during the limited acceleration.

The material handling vehicle can also include a controller that transitions the driving state from the braking mode to the slow mode to the fast mode and back to the braking mode as the steering mechanism is moved between a substantially vertical and a substantially horizontal position.

In yet another aspect of the invention, a method for controlling the acceleration of a material handling vehicle having at least a slow speed mode and a fast speed mode of operation to provide a smooth speed transition between the slow speed mode and the fast speed mode of operation is provided. The method comprises the steps of determining whether the vehicle is moving in the slow speed mode of operation, and limiting the acceleration of the vehicle to a reduced acceleration rate as compared to the normal acceleration rate when the material handling vehicle is transitioned from the slow mode of operation into the fast mode of operation while the vehicle is moving in the slow speed mode of operation. The acceleration rate is maintained at the reduced level for a predetermined period of time, and is then returned to the normal rate of acceleration after the predetermined period of time has elapsed.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
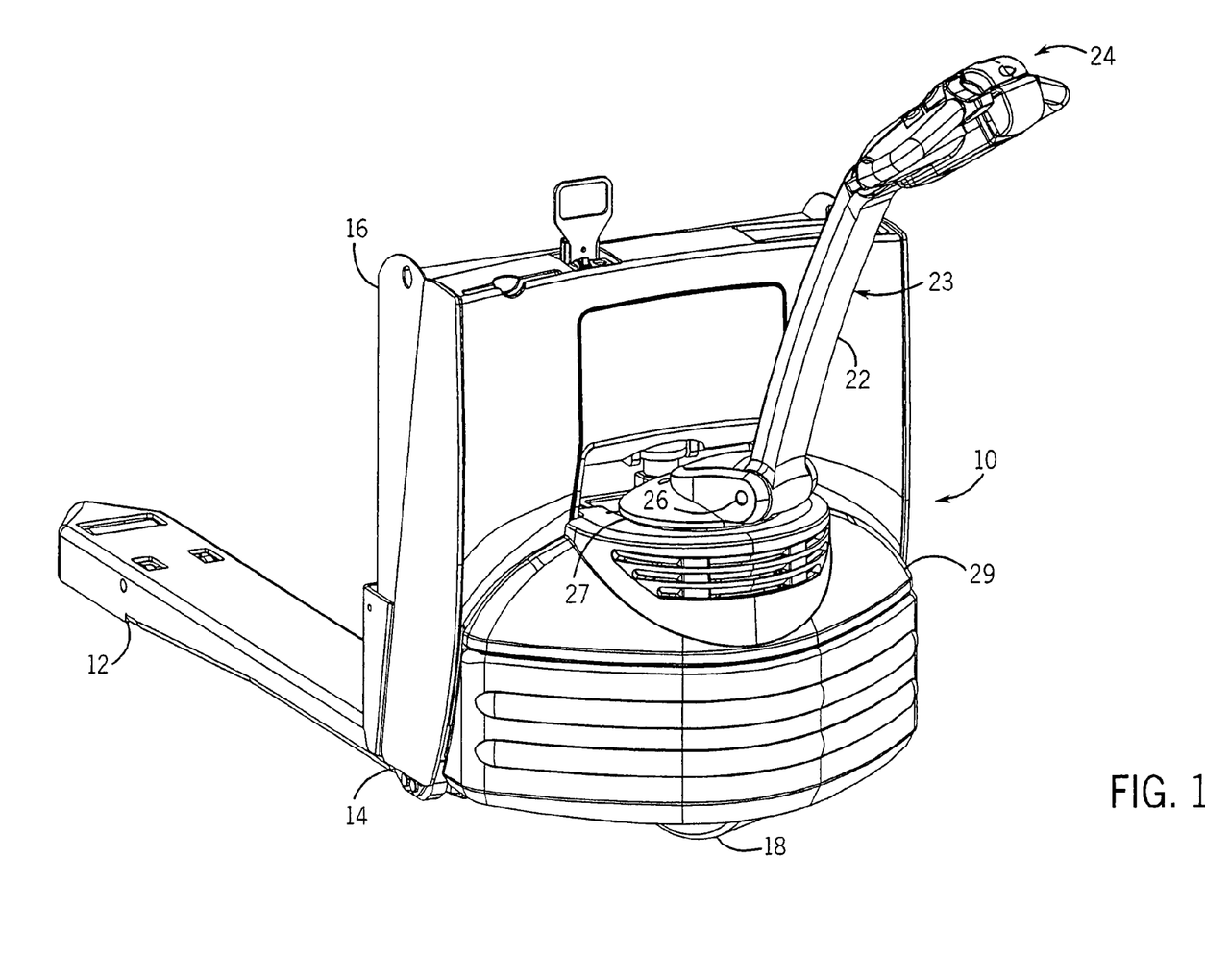
FIG. 1 is a perspective view of a pallet truck.

Referring now to the figures and more particularly to FIG. 1, a pallet truck 10 constructed in accordance with the present invention is shown. The pallet truck 10 comprises forwardly extending forks 12, a drive motor 90 (FIG. 4) provided in a motor compartment 14, a battery 96 (FIG. 4) provided in battery compartment 16, and a steered wheel 18. The steered wheel 18 is coupled to a steering mechanism 23 which includes both a tiller arm 22 and an operator control handle 24. The steering mechanism 23 is rotatable to the right and left to change the direction of the pallet truck 10 and is further movable in an arc between a substantially vertical position and a substantially horizontal position. When in either of the substantially horizontal position or the substantially vertical positions, a deadman brake 84 (FIG. 4) is activated, as described below. To assure that the truck 10 is stopped when the operator leaves the vehicle, the steering mechanism 23 is spring loaded such that it is forced into a vertical position when released.

Figure 2:
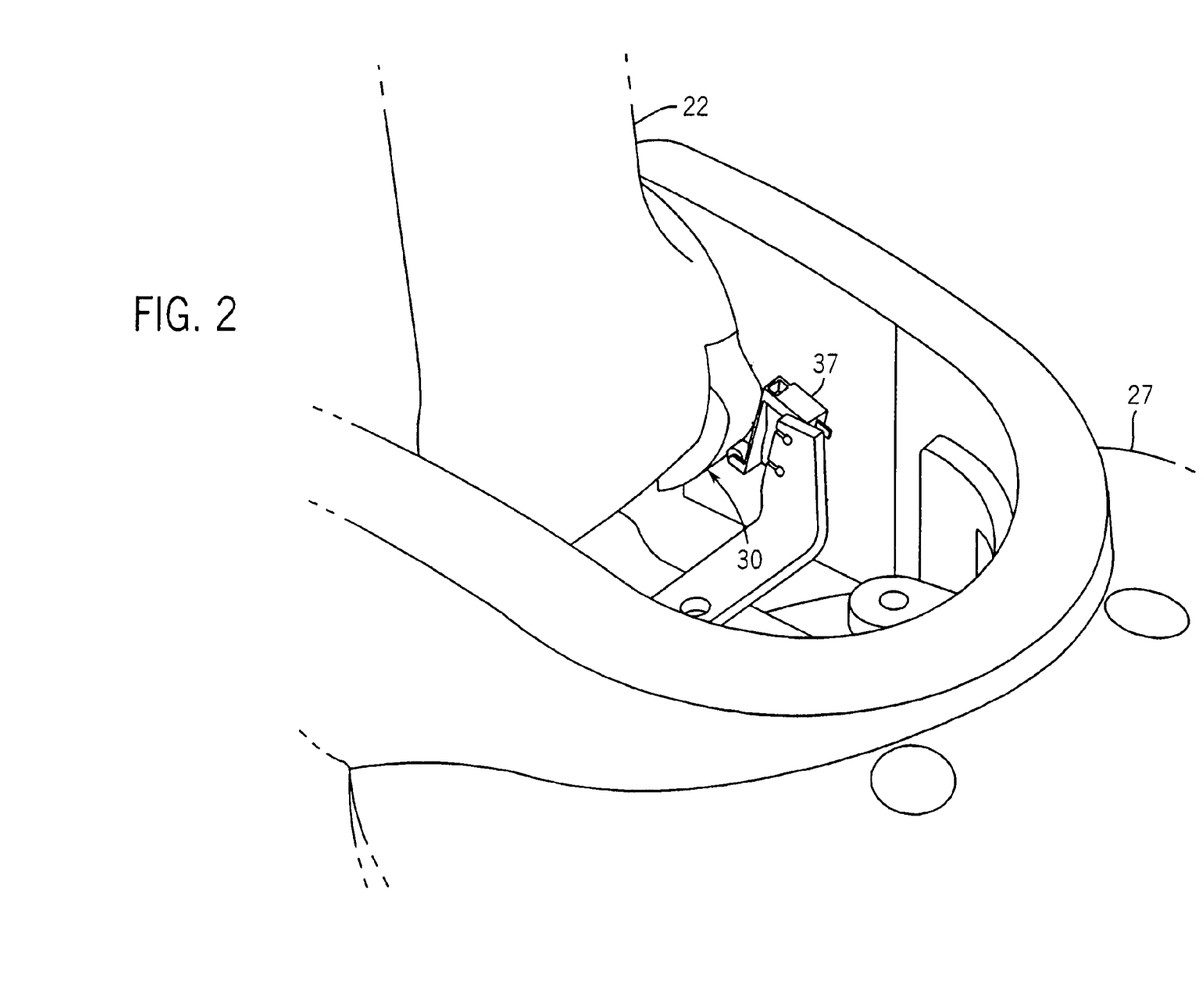
FIG. 2 is a perspective showing the details of a steering handle for a hand/rider truck.
Figure 3:
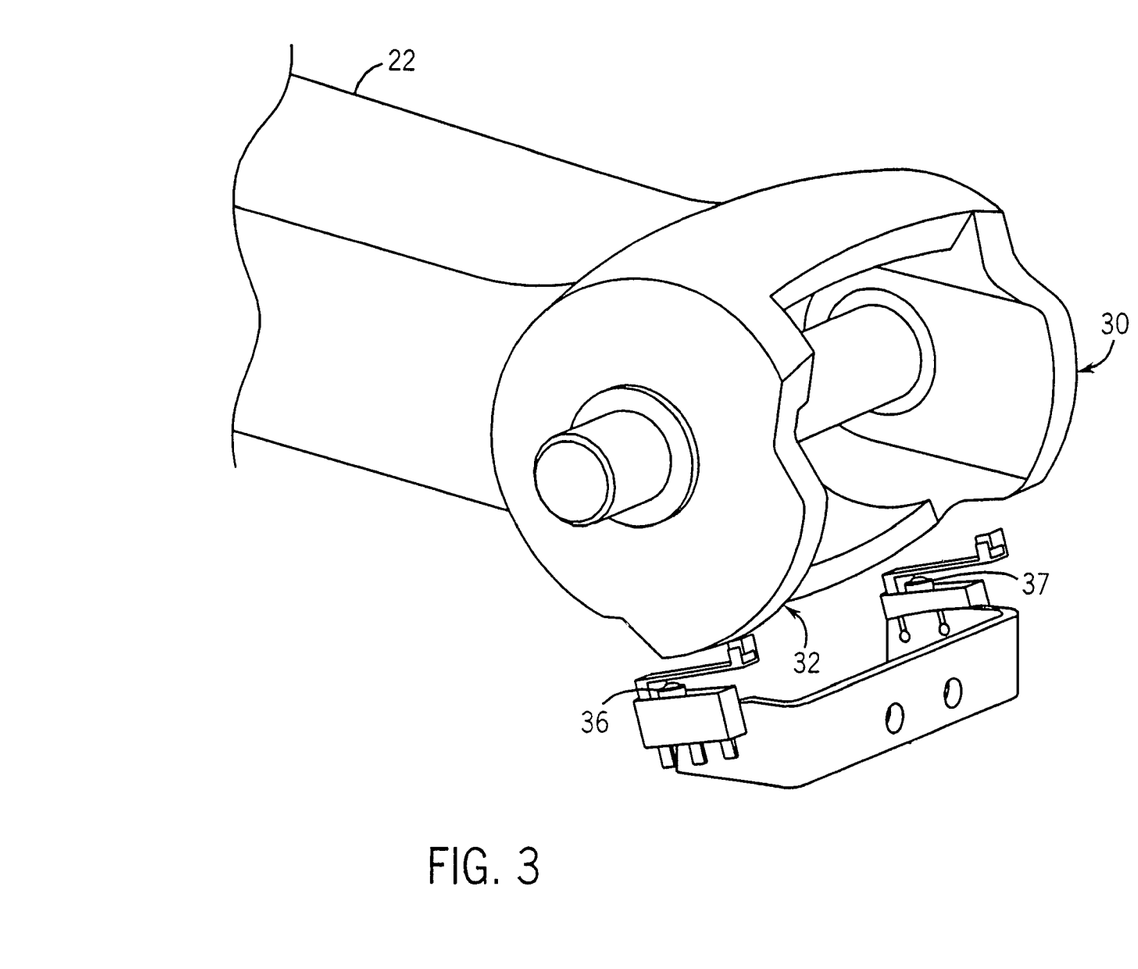
FIG. 3 is an exploded view of the tiller arm and associated switches.

Referring now to FIGS. 1, 2 and 3, the tiller arm 22 is pivotally mounted to a swiveling mount 27, which is coupled to the transmission, including steered wheel 18, of the pallet truck 10. The tiller arm 22 can swivel the swiveling mount 27 to the right and left, thereby allowing the operator to change the direction of the lift truck 10 by moving the steered wheel 18. The tiller arm 22 is further pivotable around a pivoting axis 26, and is moveable through a "driving arc" extending from a substantially horizontal to a substantially vertical position around this axis, as shown in FIG. 5. As the tiller arm 22 is rotated through the driving arc, cammed surfaces 30 and 32 provided on a distal end of the tiller arm 22 activate switches 36 and 37 which provide signals to a controller 106 (FIG. 4) indicating an angle of rotation of the tiller arm 22. As the angle changes, the controller 106 transitions the truck 10 between a series of driving states including a top brake mode 116, a bottom brake mode 124, a slow speed mode 120, and a fast speed mode 122. One method for providing these speed modes is described in U.S. patent application Ser. No. 10/626,891 filed Jul. 25, 2003 and entitled "Pallet Truck Tiller Arm with Angle Detection for Speed Select", which is hereby incorporated by reference for its description of such a system. Various other methods for detecting angles of rotation of a tiller arm, and various other methods of switching between speed modes will, however, be apparent, and any of these methods can be used in accordance with the invention as claimed.

Figure 4:
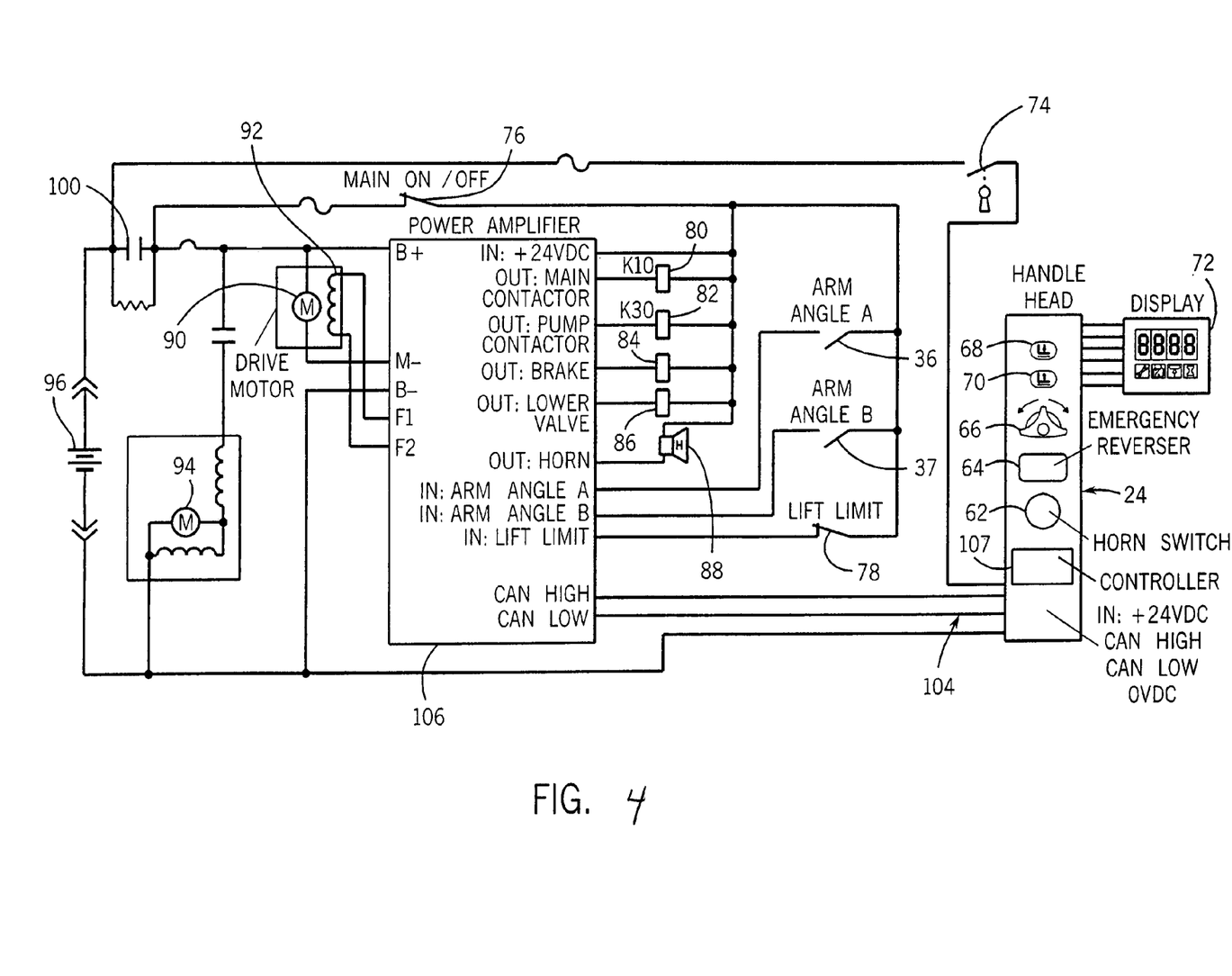
FIG. 4 is a block diagram of the control circuit of the pallet truck of FIG. 1.
Figure 5:
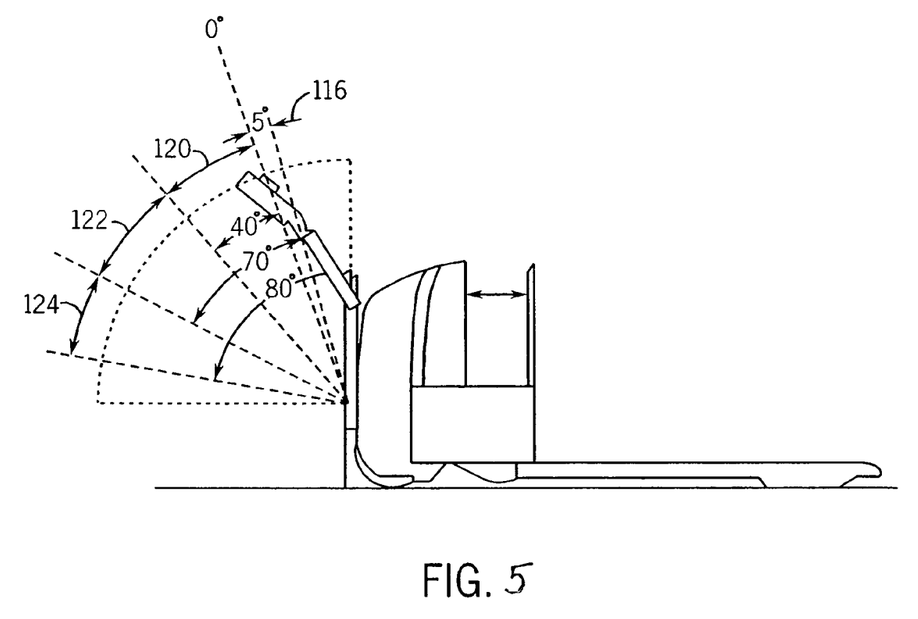
FIG. 5 is a side view of the pallet truck of FIG. 1 illustrating a driving arc of the tiller arm and associated angles for changing driving states.

Referring now to FIG. 4 a block diagram of a control system of the pallet truck 10 of the present invention is shown. Power is applied to the pallet truck 10 by activation of a main on/off switch 76 and a key switch 74, which activates the control handle 24. The control system comprises a controller 106 which receives input control signals from each of the switches 36 and 37, as well as from the control handle 24 via a CAN (controller area network) bus 104. The control handle 24 includes a controller 107 connected to the CAN bus, as well as switches and activators providing lift 70 and lower 68 controls for the fork 12 (FIG. 1), an emergency reverse button 64, a horn switch 62 for activating the horn 88, and a display 72 which can provide information such as battery state of charge, hour meter, or other operational information, as well as error information. The control handle 24 further includes a directional and speed control, preferably in the form of a thumbwheel or twist grip 66, which is selectively activated by an operator in a first direction to provide a control signal for motion in the forks first direction and in a second direction to provide a control signal for motion in the forks trailing direction. Based on the received inputs, the controller 106 activates a horn 88, a lift motor solenoid 82, a fork lowering valve solenoid 86, a deadman brake coil 84, and a main control contactor 80. The controller 106 further controls an electrical drive mode 90 by applying a selected voltage.

The key switch 74 is activated to apply power to the control handle 24, putting the pallet truck 10 into an operational mode. Once the key switch 74 is activated, the operator can provide directional and functional control information to the pallet truck 10 through the controls on the control handle 24, as described above. Upon a power request, the controller 106 pulls in the main contactor solenoid 80, closing normally open contact 100, and therefore allowing power to be applied to the circuit from the battery 96.

In operation, the controller 106 monitors the switches 36 and 37 and, based on the state of the switches 36 and 37, determines whether the truck 10 is in the top brake mode 116, the slow mode 120, the fast mode 122, or the bottom brake mode 124. In the top and bottom brake modes 116 and 124, the brake 84 is activated, and the truck 10 is prevented from moving until the tiller arm 22 is rotated to an angle at which either the slow speed mode 120 or fast speed mode 122 is activated. In the fast speed mode 122, the controller monitors a command signal from the twist grips 66, and commands the truck 10 to move at a rate of speed varying between a standstill and a predetermined fast mode maximum speed based on the level of the command signal. In the slow speed mode, the controller again monitors the command signal from the twist grips 66 and drives the truck 10 at a speed ranging between a standstill and a predetermined slow mode maximum speed.

While any number of speed ranges can be provided in both the slow and fast modes of operation 120 and 122, respectively, typically the speed is limited to a maximum speed of one mile per hour in the slow mode, and a maximum speed of 3.5 miles per hour in the fast mode. The acceleration rate of the truck 10 is determined by the controller 106, which applies a voltage across the motor 90 at either a predetermined or a user selectable rate. Here, typical acceleration rates for a truck 10 having a twenty-four volt motor 90 and a maximum fast speed mode of 3.5 miles per hour range from a minimum acceleration of three seconds to apply the twenty-four volt command, and a maximum acceleration of one tenth of a second to apply the twenty-four volt command. Again, these numbers can be varied depending on the specific truck, operational conditions, and other factors.

When transitioning between the slow and fast modes 120 and 122, respectively, the controller 106 selectively moderates the acceleration of the truck 10 during and after the transition to prevent the truck 10 from changing speeds quickly and therefore to provide a smooth transition between speed modes. This moderation in acceleration is particularly important, for example, if the speed mode of the truck 10 is changed while the truck 10 is being operated in tight corners and an abrupt change in speed is undesirable or made inadvertently. To assure a smooth transition in speed, the command signal from the twist grip 66 is monitored and timed while active and while the truck 10 is in the slow mode 120, and this slow mode time is then evaluated when the tiller arm 22 is rotated to transition the truck 10 from the slow mode 120 to the fast mode 122. If the twist grip 66 is not active or has been active for only a short period of time in the slow mode 120, the truck 10 is either not moving or is moving at a very slow rate, and the truck 10 can be accelerated at the normal rate when transitioned to the fast mode 122. If the twist grip 66 has been active for a period of time, however, a lower level of acceleration is desirable.

Figure 6:
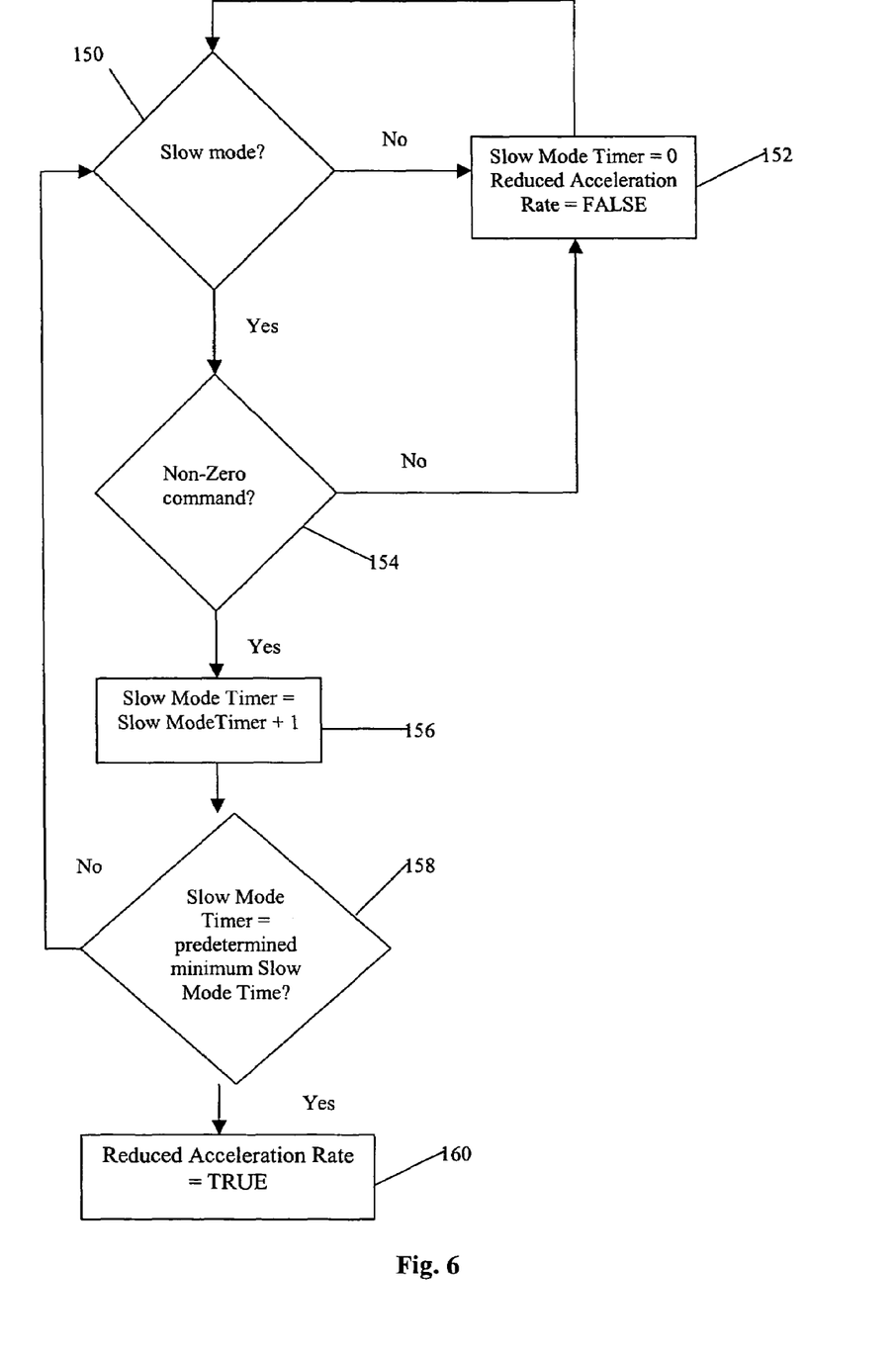
FIG. 6 is a flow chart illustrating a method for determining when to limit the acceleration of the truck during a transition between the slow and the fast mode of operation.

Referring now to FIG. 6, a flow chart illustrating the steps required to determine when to limit the acceleration of the truck 10 is shown. Here, as described above, the controller 106 monitors the driving states and calculates a time during which the truck 10 is in the slow mode 120 and is receiving a non-zero speed command from the twist grips 66. Initially, the controller 106 analyzes the state of the truck 10 to determine whether the truck 10 is in the slow mode 120 (step 150). If not, the slow mode timer is set to zero (step 152), and it is not necessary to reduce the acceleration rate. If the truck 10 is in the slow mode 120, the controller 106 determines whether a non-zero command is received from the twist grips 66 (step 154). If the command from the twist grips 66 is zero, the slow mode timer is again set to zero (step 152). If, however, a non-zero command is received from the hand grips 66 the slow mode timer is incremented by the controller 106 (step 156), and the controller 106 determines whether the accrued time has met or exceeded a predetermined minimum slow mode time (step 158) indicating that the truck 10 is moving at a speed. If the predetermined minimum slow mode time has not been exceeded, the controller 106 continues to monitor the mode of operation (step 150) and repeats steps 154-158 until the accrued time in the slow mode timer exceeds the predetermined minimum time. When the slow mode time exceeds the predetermined minimum, the controller 106 determines that the truck 10 is moving at a speed that will result in an undesirable rapid acceleration if the driving state is changed to the fast mode 122. Therefore, the controller 106 sets a flag (step 160) to automatically reduce the acceleration rate as compared to the normal acceleration rate when the truck 10 enters the fast mode 122, as discussed with reference to FIG. 7 below. The reduction in acceleration rate is accomplished by reducing or limiting the rate at which voltage is applied to drive the motor, thereby decreasing the speed achieved by the truck 10 per unit time and preventing rapid acceleration of the truck 10.

Figure 7:
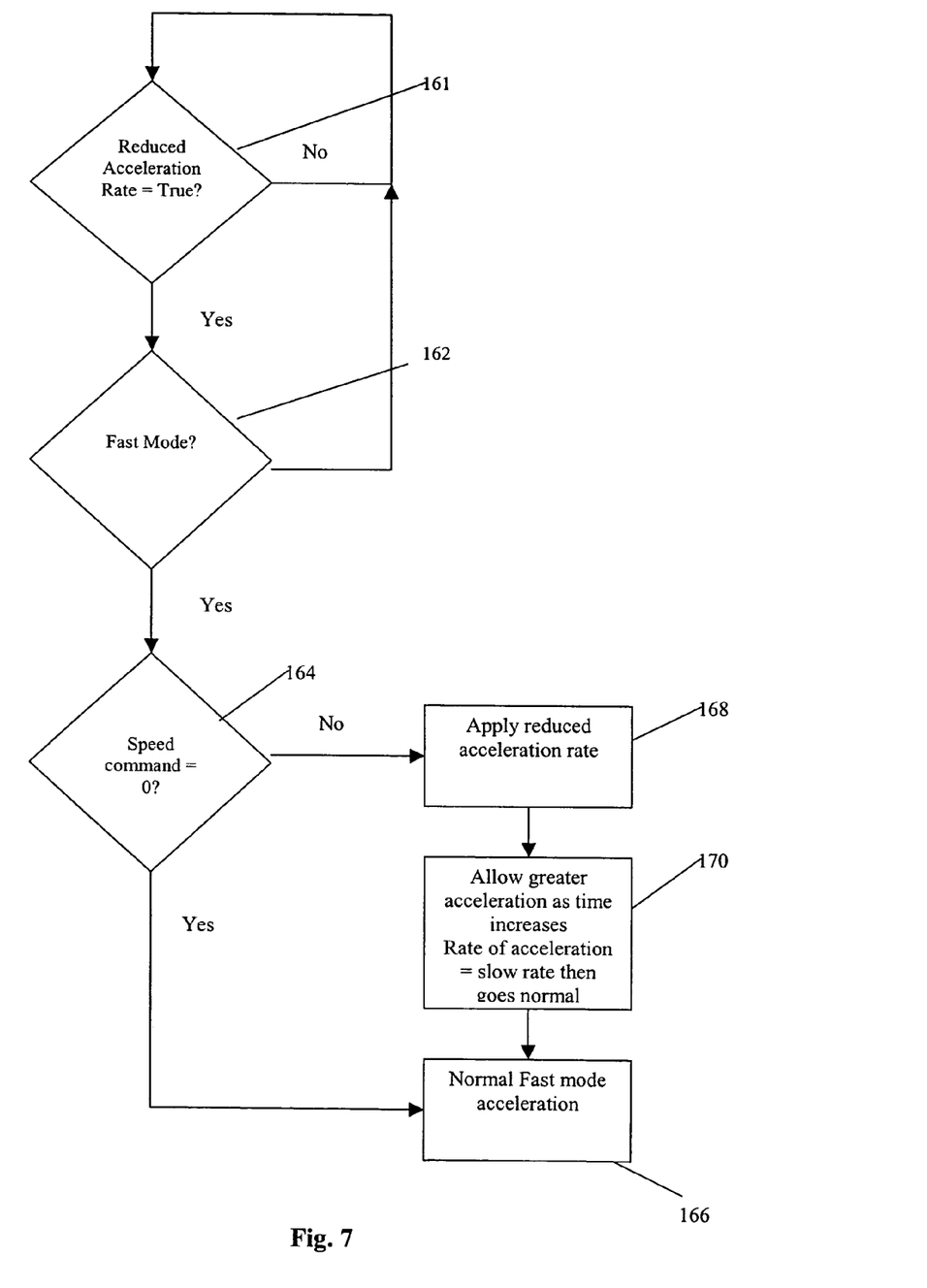
FIG. 7 is a flow chart illustrating a method for determining when to return to the normal rate of acceleration from the reduced rate of FIG. 6.

Referring now to FIG. 7, the controller 106 monitors the reduced acceleration rate flag (step 161) and, when the flag is set, monitors the driving state of the truck 10 to determine whether the truck 10 has entered the fast mode 122 (step 162). If so, the controller 106 verifies that a non-zero speed command is received from the twist grips 66 (step 164). If the twist grips 66 have been returned to a neutral position and a speed command of zero is received, the truck 10 is not moving and the normal rate of acceleration can be applied without any need to moderate the acceleration. If the speed command from the twist grips 66 is not zero, the truck 10 is moving, a reduced acceleration rate is applied (step 170). The reduced acceleration rate can be imposed on the truck 10 for a predetermined period of time or, alternatively, can be ramped up from the reduced rate to the normal rate of acceleration at a predetermined rate of change or within a predetermined time. If the controller 106 determines that the twist grips 66 have been returned to a neutral position to provide a zero speed command, or the truck 10 has been put in one of the brake states 116 and 124, the reduced acceleration is no longer necessary, and the reduced acceleration rate flag is reset to zero.

In one embodiment of the invention, the truck 10 is designed to have a maximum speed of 3.5 miles per hour in the fast mode 122 as described above. Also as described above, the acceleration rate to reach this speed can be user selectable between a minimum acceleration rate at which the voltage across the motor is raised from zero to twenty-four volts in a period of three seconds to achieve the 3.5 mile per hour maximum speed to a maximum rate in which the same voltage increase is made in one tenth of a second. In this application, the reduced acceleration rate was set to the minimum acceleration of twenty-four volts in three seconds to moderate speeds and provide a smooth transition. Under these conditions, a predetermined minimum slow mode time of one second was determined experimentally to require a reduced acceleration to provide a smooth transition between speed modes. The reduced acceleration rate was applied for a period of three seconds, which substantially allows the truck 10 to reach a relatively constant speed in the fast mode 122 before the acceleration rate is returned to the user-selected normal rate, and therefore is sufficient to allow the operator to reach a desired speed before the acceleration rate is changed. The acceleration rate was then allowed to return to the normal acceleration rate.

Although these time frames were determined to work experimentally in the case described, a number of different time frames could be appropriate depending on the response of the truck 10 to various drive commands, acceleration rates of the truck 10, tiller arm switching angles, weight of the truck 10, the speed of the truck 10 when fully loaded, and operator perceptions. In some applications, for example, it may be advisable to limit the acceleration rate of the truck 10 whenever the truck 10 is transitioned from the slow mode 120 to the fast mode 122. In other applications the truck 10 may not reach a speed at which it is necessary to moderate the acceleration until well after the one second time frame described above. Such a situation may occur, for example, when the truck is particularly heavy, or when the truck is designed to have a very slow normal rate of acceleration. Furthermore, the acceleration rate can be maintained at a predetermined reduced rate for a period of time, or reduced to a predetermined rate and allowed to ramp up to the normal rate either as a function of overall time or predetermined rate of change.

Furthermore, as an alternative to or in addition to monitoring the speed control signal from the twist grips 66, the monitored parameter could be a motor speed, current, or voltage signal, or actual speed feedback from the motor, each of which provide an indication of a motor operated at an elevated speed, and each of which therefore provide an indication that the transition to the fast mode 122 may result in an undesirable rapid increase in speed. Additionally, the allowable motor speed, current, or voltage could be limited instead of or in addition to the acceleration rate to provide similar results.

Referring now to FIG. 5, a side view of the pallet truck 10 illustrating the preferred angles for switching between driving states is shown. As described above, the tiller arm 22 is movable up and down through a driving arc that ranges from a nearly horizontal position to a substantially vertical position, and is spring loaded to drive the steering arm 22 to a default position in the substantially vertical position. In a preferred embodiment of the invention, the tiller arm 22 is moveable between mechanical stops provided at angles of −5 degrees and 80 degrees, as measured versus a line drawn through the center of the tiller arm 22 to the control handle 24. The cammed surfaces 30 and 32 are positioned to provide angle indications for switching the operation of the vehicle between the bottom (horizontal) brake position 124, a fast speed mode 122, the slow speed mode 120, and the top (vertical) brake mode 116, as described above.

Although preferred switching angles and speed levels have been described, the truck can be configured to provide switching at any number of angles. Furthermore, although specific speed levels have been described, it will be apparent that variations can be made to the selected speed levels without exceeding the scope of the invention. Additionally, other methods of providing angular indication for the steering mechanism and providing a control signal, such as with a potentiometer or an encoder, will be known to those of skill in the art.

Furthermore, although the invention has been described for use with a four state control system, it will be apparent that the principles of the invention could be applied to provide various driving functions at various additional angles. For example, a pallet truck could be constructed to include a plurality of different speed ranges as the steering mechanism is rotated, as well as one or more stop position.

Additionally, although the invention has been described with reference to a pallet truck, the principles described could also be applied to various other types of material handling vehicles.

Furthermore, although a specific method for switching between speed modes by rotating the tiller arm has been shown, it will be apparent that other aspects of the invention, and particularly methods for smoothing the transition between speed modes, can be practiced using various other methods for switching between modes.

Additionally, although the invention has been described with reference to a slow mode and fast mode based on tiller arm angle, different methods of slow mode and fast mode may be used. For example, thermal cutback, or operator specific limits on speed may be used to provide a slow mode.

The invention has been described in detail with particular reference to certain preferred embodiments thereof, but it will be understood that variations and modifications can be effected within the spirit and scope of the invention.

I claim:

1. A method for controlling the acceleration of a material handling vehicle transitioning between at least a slow and a fast speed mode of operation to provide a smooth transition between the modes of operation, the method comprising the following steps:
   determining when the vehicle is in the slow speed mode;
   determining whether the vehicle is being driven at a non-zero speed in the slow speed mode;
   calculating a time of operation at the non-zero speed in the slow speed mode;
   limiting the acceleration of the vehicle when the vehicle is transitioned into the fast mode of operation and the calculated time of operation at the non-zero speed in the slow mode exceeds a predetermined minimum time.

2. The method as recited in claim 1, further comprising the step of determining the mode of operation is determined by an angle of a steering mechanism provided on the industrial truck.

3. The method as recited in claim 1, further comprising the step of increasing the acceleration to a predetermined normal rate after the vehicle has been in the fast mode of operation for a predetermined amount of time.

4. The method as recited in claim 3, further comprising the step of establishing the predetermined amount of time as a function of an amount of time required to accelerate the vehicle to the maximum speed at the limited acceleration rate.

5. A material handling vehicle, comprising:
   a drive system controlled by the operator to drive the material handling vehicle in a selected direction;
   a steering mechanism moveable along an arc to select between at least a slow and a fast mode of operation;
   an operator control for selecting a speed of the vehicle in the selected mode of operation; and
   a controller for selectively placing the material handling vehicle in the slow mode or the fast mode of operation based on the angle of the steering mechanism, wherein the controller is further programmed to:
   (i) calculate a time period that the material handling vehicle is moving in the slow mode of operation; and
   (ii) limit the acceleration of the material handling vehicle to a predetermined rate of acceleration below a normal rate of acceleration when the time period exceeds a predetermined minimum and the material handling vehicle is moved into the fast mode of operation.

6. The material handling vehicle of claim 5, wherein the controller is programmed to limit the acceleration of the material handling vehicle for a predetermined time.

7. The material handling vehicle of claim 6, wherein the predetermined time is calculated to allow the vehicle to reach a maximum speed during the limited acceleration.

8. The material handling vehicle as defined in claim 5, wherein the braking mode is activated at a first angle as the steering mechanism is rotated toward the vertical and at a second angle as the steering mechanism is rotated toward the horizontal.

9. The material handling vehicle as defined in claim 5, wherein the controller limits the speed control received from the operator control based on a predetermined maximum when the material handling vehicle is in the slow speed mode.

10. The material handling vehicle as defined in claim 5, wherein the controller transitions the driving state from the braking mode to the slow mode to the fast mode and back to the braking mode as the steering mechanism is moved between a substantially vertical and a substantially horizontal position.

11. A method for controlling the acceleration of a material handling vehicle having at least a slow speed mode and a fast speed mode of operation to provide a smooth speed transition between the slow speed mode and the fast speed mode of operation, the method comprising the following steps:
   determining whether the vehicle is moving in the slow speed mode of operation;
   limiting the acceleration of the vehicle to a reduced acceleration rate as compared to a normal acceleration rate when the material handling vehicle is transitioned from the slow mode of operation into the fast mode of operation while the vehicle is moving in the slow speed mode of operation;
   maintaining the vehicle at the reduced rate of acceleration for a predetermined period of time; and
   returning the acceleration of the vehicle to the normal rate of acceleration after the predetermined period of time has elapsed.

12. The method as recited in claim 11, wherein the predetermined period of time is selected to allow the vehicle to reach maximum speed at the reduced acceleration rate.

13. The method as recited in claim 11, wherein the step of determining whether the vehicle is moving in the slow speed mode comprises monitoring a speed command to the vehicle during the slow speed mode and calculating a period of time that a non-zero speed command is applied to the vehicle.

14. The method as recited in claim 13, further comprising the step of limiting the acceleration rate of the vehicle only when the calculated period of time that the vehicle has been in the slow speed mode exceeds a predetermined minimum slow speed time.

15. The method as recited in claim 12, wherein the step of determining whether the vehicle is moving in the slow speed mode comprises monitoring at least one of a motor current, a motor voltage, or a voltage signal.

16. The method as recited in claim 11, wherein the step of determining whether the vehicle is moving in the slow speed mode comprises monitoring a speed command signal.

17. The method as recited in claim 11, further comprising the step of switching between the slow speed mode and the fast speed mode by changing the angle of a steering tiller coupled to the material handling vehicle.

18. The method as recited in claim 11, further comprising the step of returning the material handling vehicle to the normal rate of acceleration whenever the brake is activated or a zero speed command is received.

* * * * *